United States Patent
Lorie et al.

[11] Patent Number: 5,915,039
[45] Date of Patent: Jun. 22, 1999

[54] METHOD AND MEANS FOR EXTRACTING FIXED-PITCH CHARACTERS ON NOISY IMAGES WITH COMPLEX BACKGROUND PRIOR TO CHARACTER RECOGNITION

[75] Inventors: Raymond Amand Lorie; Jianchang Mao; Kottappuram Mohamedali Mohiuddin, all of San Jose, Calif.

[73] Assignee: International Business Machines Corporation, Armonk, N.Y.

[21] Appl. No.: 08/747,350

[22] Filed: Nov. 12, 1996

[51] Int. Cl.⁶ ........................................ G06K 9/72
[52] U.S. Cl. .................... 382/230; 382/209; 382/272; 382/292
[58] Field of Search .................... 382/171, 178, 382/179, 182, 194, 229, 230, 225, 286, 205, 209, 217, 317, 215, 292, 279, 272; 358/470; 345/436

[56] References Cited

U.S. PATENT DOCUMENTS

| | | | |
|---|---|---|---|
| 4,468,703 | 8/1984 | Fujiwara et al. | 382/172 |
| 5,016,173 | 5/1991 | Kenet et al. | 382/128 |
| 5,033,097 | 7/1991 | Nakamura | 382/174 |
| 5,033,104 | 7/1991 | Amano | 382/177 |
| 5,091,964 | 2/1992 | Shimomura | 382/174 |
| 5,144,679 | 9/1992 | Kakumoto et al. | 382/113 |
| 5,307,422 | 4/1994 | Wang | 382/177 |
| 5,523,794 | 6/1996 | Mankovitz et al. | 348/460 |
| 5,572,601 | 11/1996 | Bloomberg | 382/175 |
| 5,581,370 | 12/1996 | Fuss et al. | 358/447 |
| 5,594,814 | 1/1997 | Fast et al. | 382/173 |
| 5,627,661 | 5/1997 | Negishi et al. | 358/470 |
| 5,644,656 | 7/1997 | Akra et al. | 382/195 |
| 5,668,897 | 9/1997 | Stolfo | 382/283 |
| 5,694,471 | 12/1997 | Chen et al. | 380/25 |
| 5,696,848 | 12/1997 | Patti et al. | 382/254 |

OTHER PUBLICATIONS

Casey et al., "A Survey of Methods and Strategies in Character Segmentation", originally as "Character Segmentation in Document OCR: Progress and Hope", 4th Annual Symposium on Document Analysis and Information Retrieval, Las Vegas, Nevada, 1995, pp. 13–39.

*Primary Examiner*—Amelia Au
*Assistant Examiner*—Timothy M. Johnson
*Attorney, Agent, or Firm*—R. Bruce Brodie

[57] ABSTRACT

Fixed-pitch, fixed-font characters embedded in a noisy gray-scale image of picture elements (pels) within a complex background can be extracted prior to execution of any recognition operations by first deriving a normalized Boolean-coded image from the gray-scale image. Then, a subset of at least three uncontaminated character triples is formed by filtering the Boolean-coded image. Next, an affine transform is approximated from locations in the Boolean-coded image of at least three noncollinear ones of the uncontaminated character triples. Lastly, the locations in a logical matrix array of all possible character triples are estimated according to the affine transform.

9 Claims, 4 Drawing Sheets

METHOD AND MEANS FOR EXTRACTING FIXED-PITCH CHARACTERS ON NOISY IMAGES WITH COMPLEX BACKGROUND PRIOR TO CHARACTER RECOGNITION

FIELD OF THE INVENTION

This invention relates to the extraction of fixed attribute characters from images prior to their recognition and, more particularly, to the extraction of said characters from noisy images with complex backgrounds such as may be found on printed coupons, tickets, and the like.

DESCRIPTION OF THE RELATED ART

For purposes of this invention, a "form" is taken to be any writing having a cognizable structure or organization and customarily having printed character portions intended to memorialize an event, represent an action, claim, etc. Illustratively, tickets and coupons are a frequently used class of forms. In this regard, a ticket is taken to mean a paper slip or card having printed matter thereon indicating that its holder has paid for or is entitled to a specified service, right, or consideration, i.e., a theater ticket or an airline ticket. A coupon also has printed matter thereon and is similar to a ticket in that it constitutes a claim of right or entitlement except that it is usually detachable from some other writing, such as a bond.

It is well appreciated in the prior art that form processing by machine usually involves the steps of (a) form recognition, (b) form dropout and data extraction, (c) character recognition, (d) contextual process, and (e) verification and correction. This is a general scheme and may not be suitable in every circumstance, such as automatic reading of International Air Transport Association (IATA) flight coupons. In this latter case, filled-in data often appear outside the fields provided on the face of the coupon. This typically occurs where coupons, as generated by computer typewriting, have the entire text shifted and skewed due to improper paper feeding.

This problem arises out of the process of printing characters on a medium, such as paper, and not by scanning the printed document. It cannot be solved by form registration and dropout. This derives from the fact that form registration and dropout are based on the layout of preprinted forms (preprinted lines, special landmarks, and text). That is, even if the preprinted text and lines are completly dropped out, there remains the problem of locating filled-in characters and grouping them into fields. This is the case, especially when there is no extra space between neighboring fields in the coupon design. IATA flight coupons illustrate the lack of extra space. Indeed, due to imperfect registration, form dropout often destroys user-entered data resulting in characters with broken or missing strokes.

Form images are often contaminated by noise and stains. Even on machine-printed forms, characters often touch. Indeed, low contrast between filled-in data and background also causes characters to touch each other after binarization. In the case of flight coupon images, characters touch because flight coupons are often printed over multiple copies by red wax. Another source of touching characters stems from the overlap of filled-in data and preprinted text and lines, and from handwritten marks overwritten on the filled-in data by operators.

In this patent, the term "binarization" is taken to mean any image-mapping method by which a gray-scale image is projected onto an image of Boolean-coded pels. That is, each Boolean-coded pel can assume only one of two possible color values, i.e., black or white.

Casey and Lecolinet summarize in "A Survey of Methods and Strategies in Character Segmentation", appearing originally as "Character Segmentation in Document OCR: Progress and Hope", Fourth Annual Symposium on Document Analysis and Information Retrieval", pages 13–39, Las Vegas, Nev., 1995, traditional extraction techniques used for segmenting and extracting machine-printed characters. These techniques include white space and pitch analysis, projection, connected component, and bounding box analysis-based techniques. As Casey points out, these techniques require dropping out background patterns before segmentation and extraction of characters.

Illustratively, the techniques based on white space and pitch analysis usually exploit only the constant pitch constraint within a text line. They require that a large portion of characters within a line is clean.

Projection-based techniques work very well on nontouching characters. However, when printed characters are touching, the vertical projection often contains locally non-zero minimum points. These nonzero minimum points may not be the correct split points, and the correct boundary between two touching characters may not have minimum projection points. Lastly, connected component and bounding box-based techniques perform poorly on broken characters and touching characters. They require additional effort to merge broken pieces and split touching characters.

Reference is made to Wang, U.S. Pat. 5,307,422, "Method and System for Identifying Lines of Text in a Document", issued Apr. 26, 1994. Wang discloses and claims a vertically-oriented character extraction method especially useful for columnar Chinese language text and the like.

An image is divided in columns and each column is in turn subdivided by a horizontal histogram of black-colored pels into rectangular units. The rectangular units having heights in black pels above and below predetermined thresholds are discarded. The remaining rectangular areas which overlap vertically within each column are linked together horizontally from adjacent columns.

SUMMARY OF THE INVENTION

It is an object of this invention to devise a method and means for extracting characters on noisy images within a complex background prior to any major character recognition phase.

It is a related object to devise an extraction method and means in which filled-in characters can be located and extracted from a gray-scale image without completely removing background patterns or performing form dropout.

It is yet another object to devise a method and means to extract characters notwithstanding the fact that form images are often contaminated by noise and stains, and that machine-printed forms and characters often touch.

Restated more succinctly, it is an object of this invention to devise an extraction method and means for fixed-pitch, fixed-font characters on gray-scale images that avoid dropout of background and preprinted text and lines before recognition, and can recover partially damaged characters.

The foregoing objects are believed satisfied by a method and means that takes into account the fact that:

(a) filled-in, machine-printed text on flight coupons are computer generated and have fixed-pitch and fixed-line spacing;

(b) there exists a high expectation that at least three or more uncontaminated fixed-pitch character triplets may be identified even though flight coupon images and the like are often very noisy; and (c) the possible locations on the image of remaining fixed-pitch characters can be predicted from a transform determined by the uncontaminated fixed-pitch character triplets.

More particularly, the method and means of the invention involves forming a normalized Boolean-coded image from the original gray-scale image of the ticket or coupon; obtaining a subset of at least three uncontaminated character triples by filtering the Boolean-coded image in both raster scan line and vertical scan line directions; approximating an affine transform from the locations (x, y) of at least three noncollinear ones of the uncontaminated character triples; and estimating the locations (i,j) in a logical matrix array of all possible character triples according to the affine transform, whereby character recognition operations can then be executed on the clusters of Boolean-coded pels as projected at locations (i,j) on the matrix array.

In this invention, the formation of a normalized Boolean-coded image requires determining a global threshold of gray values (mean and standard deviation) over the gray-scale image. After this, a local threshold of gray values (mean and standard deviation) in an m×n pel neighborhood around each kth pel is ascertained. Then, the gray-scale magnitude of each kth pel is resolved as either black or white against the local mean. This is according to whether the standard deviation of the local threshold exceeds a predetermined magnitude; otherwise, the gray-scale magnitude of the kth pel is resolved against the global mean.

The step of deriving a subset of at least three uncontaminated character triples involves raster (horizontal) scanning the Boolean-coded image and converting any white cluster run of pels of length less than a predetermined threshold into a black cluster run. This results in blackening characters. Also, neighboring characters are connected if the length of the white cluster run is less than the gap between two neighboring characters plus twice the character width.

After this horizontal processing, the Boolean-coded image is vertically scanned and any black cluster run is converted into a white cluster run if the black run does not lie within a predetermined tolerance of character height. Next, the image is horizontally scanned again and all black cluster runs, whose length is less than the width of character triples, are removed. Lastly, long black cluster runs are broken into several pieces whose lengths are approximately twice the width of a character triple.

The search for at least three uncontaminated character triples involves convolving a mesh over the black clusters of runs. The location with the minimum cost for each black cluster is considered as an uncontaminated character triple if the cost is below some threshold.

The step of approximating the affine transform further includes the step of ascertaining the location (i,j) of a predetermined one of the character triples such that i=[X/($C_w$+$C_g$)];j=[y/($C_h$+$l_g$)]; $C_W$, $C_h$ are character width and height; and $c_g$, $l_g$ are the intercharacter gap and the gap between neighboring text lines, respectively.

An affine transform, as used in this invention, provides a one-to-one mapping of each fixed-pitch character and its location on a matrix array representation of the Boolean-coded image. This mapping preserves collinearity under the operations of translation, rotation, scaling, shearing, and reflection such that straight lines are mapped into straight lines and parallel lines into parallel lines.

The estimation of the locations (i,j) in the matrix array as projected into locations (x, y) in the Boolean-coded image includes mapping the locations according to the affine transform $$\begin{bmatrix} x \\ y \end{bmatrix} = \begin{bmatrix} a & b \\ c & d \end{bmatrix}\begin{bmatrix} i \\ j \end{bmatrix} + \begin{bmatrix} t_x \\ t_y \end{bmatrix} = \begin{bmatrix} ia + bj + t_x \\ ic + dj + t_y \end{bmatrix} \quad (1)$$

where a, b, c, and d are constants, and $(t_x, t_y)^T$ are translation vectors.

Since the locations of the fixed-pitch characters are now known as are their sizes, then character recognition is substantially disambiguated. That is, the start and end points of each character are now well defined, substantially assisting the OCR in resolving patterns to a best fit or other basis for a particular library of characters.

DESCRIPTION OF THE PREFERRED EMBODIMENT

Figure 1:
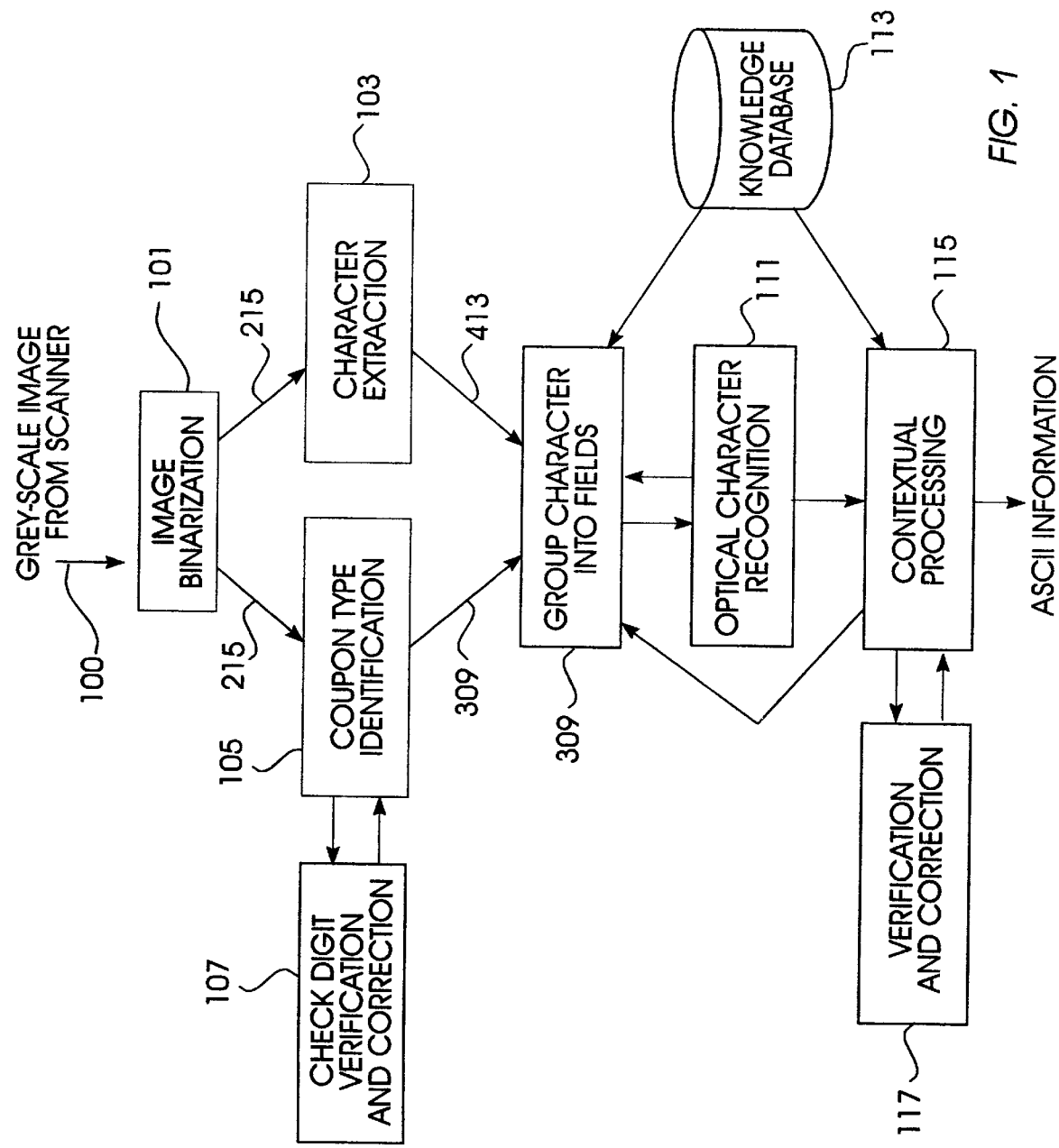
FIG. 1 depicts a flow of control of "forms processing" incorporating the invention from document scanning through and including character recognition and context verification.

Referring now to FIG. 1, there is depicted a flow of control of a "forms processing" subsystem incorporating the invention. Relatedly, the subsystem functions or steps were implemented in several software modules plus a knowledge database. These include (a) image binarization 101, (b) coupon-type identification 105 and check digit verification 107, (c) character extraction 103, (d) grouping characters into fields 109, (e) OCR 111, (f) contextual processing 115, and (g) verification 117 and correction processing 117.

Referring again to FIG. 1, the processing uses a gray-scale image 100 of the document, ticket, coupon or the like having fixed-pitch, fixed-font characters printed, typewritten, or otherwise embossed thereon. A Boolean-coded image 215 is derived from the gray-scale image 100 through a so-called image binarization process in step 101. Fixed-pitch character locations may then be extracted or mapped onto a logical array 413 from the black/white-colored image 215 in step 103. Concurrently, a coupon-type identification 309 may be derived from the extraction and recognition of a type ID number in steps 105 and 107 from a known location on the Boolean image 215.

Referring yet again to FIG. 1, the forms processing further accounts for global shifting or shearing of fixed characters. These may be compensated for by grouping characters into fields in step 109 responsive to the form type ID 309 and the character locations as extracted and represented on the logical array 413. At this point, optical character recognition operations 111 can be executed on the adjusted array 413. Disamnbiguation of character or character group identity within a field due to errors or erasures can be post-OCR processed in the contextual processing step 115, aided and abetted by a knowledge base 113 and a verification and correction facility 117.

The following paragraphs are directed to the improvements in the character extraction aspect of forms processing. These include forming a black/white image from a gray-scale image and sharpening the features thereof; finding the location of at least three noncollinear character triples in the Boolean image and constructing an affine transform therefrom; calculating all possible fixed-pitch character locations and mapping them to the logical array; and adjusting for any global shearing of character strings, performing OCR and post processing.

Image Binarization

Figure 2:
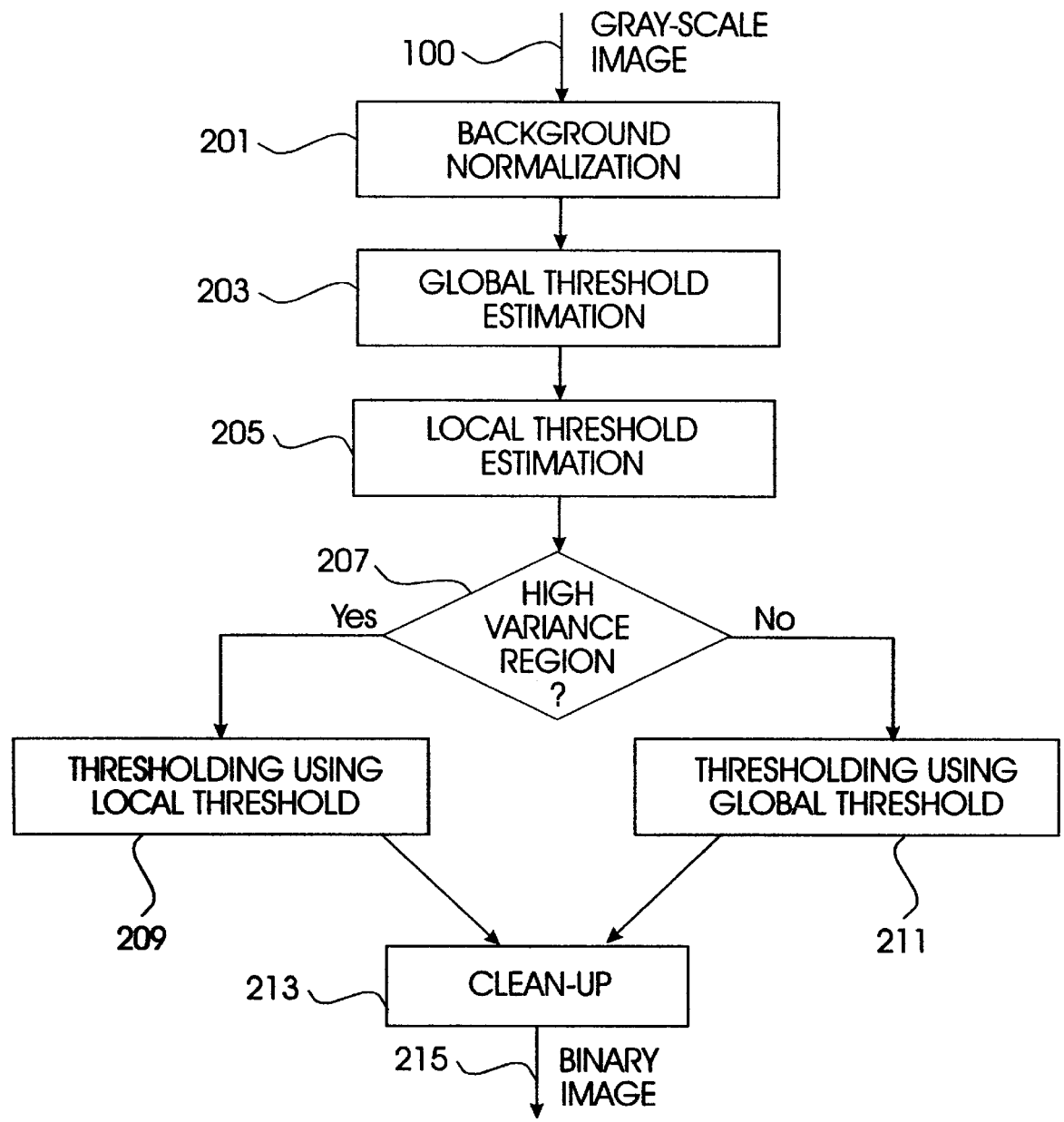
FIG. 2 sets forth the steps of the process of adaptively deriving a "normalized" Boolean-coded (binary) image from a gray-scale image of a ticket or coupon having fixed-pitch characters embossed or printed thereon.

Referring now to FIG. 2, there is set forth the steps of the process of adaptively deriving a "normalized" Boolean-coded (binary) image from a gray-scale image of a ticket or coupon having fixed-pitch characters embossed or printed thereon.

It may be recalled that image binarization is a process whereby pels of a color, gray-scale, or Boolean image are statistically redistributed one to one to another field by comparison mapping them against a threshold. In this invention, binarization has the effect of mapping a gray-scale image into a black/white image.

The term "binarization" is understood to mean that each pel can take exactly one of two values (1 or 0). Also, a "gray-scale image" is taken to be an image array where the color value for each pel is one value out of $2^n$ possible values. This constitutes a value scale from 0 (black) to $2^n$ (white). Thus, for n=4, each pel can assume a value in the range 0000 to 1111 (say 1010, etc.). This is the basis for the notion of gray-scale where 0000 mis usually taken as black (by convention) and higher numbers stand for brighter (lighter) pels. Unfortunately, a single or constant threshold for mapping gray-scale into Boolean distorts gray-scale images, especially in the presence of shaded areas. The "adaptive threshold", as used in the embodiment of this invention, is a value selected as some function of color values of near neighbor pels to the pel being assessed. This means that regions of grays are resolved into either regions of black or white pels.

Referring again to FIG. 2, the adaptive thresholding is taken to be a smoothing function primarily for resolving the mid-range of gray. The embodiment uses a 7×7 pel window subarray centered on the pel in issue. It also uses the gray-scale mean and standard deviation for the local threshold. In practice, if the pel standard deviation exceeds 10, the local threshold is used. Otherwise, a global value functions as the threshold.

First, in order to reduce the effect of different backgrounds (bright regions, shaded regions), a background normalization is performed in step 201. This is done by applying a clipping function to pel gray values. Any gray-scale value greater than the gray-scale mean of the entire image is clipped to this mean.

A global threshold as expressed in step 203 is estimated by $t_g=m_g+\alpha\sigma_g$, where $m_g$ and $\sigma_g$ are the gray-scale mean and standard deviation of the clipped image and $\alpha=-0.3$ is used.

A local threshold is also estimated in step 205 for each pel based on a 7×7 neighborhood by $t_1=m_1+\beta\sigma_1$, where $m_1$ and $\sigma_1$ are the gray-scale mean and standard deviation of the 7×7 neighborhood centered at the pel and a $\beta=-0.3$ is used.

The actual threshold value (global threshold 209 or local threshold 211) to use is based on the value of $\sigma_1$. More particularly, if $\sigma_1>10$, then the local threshold 209 is used. Otherwise, the global threshold $\sigma_g$ at step 211 is used. The decision point 207 is followed by a cleanup step 213 prior to completing the Boolean image formation 215.

IDENTIFICATION OF THE COUPON TYPE

Figure 3:
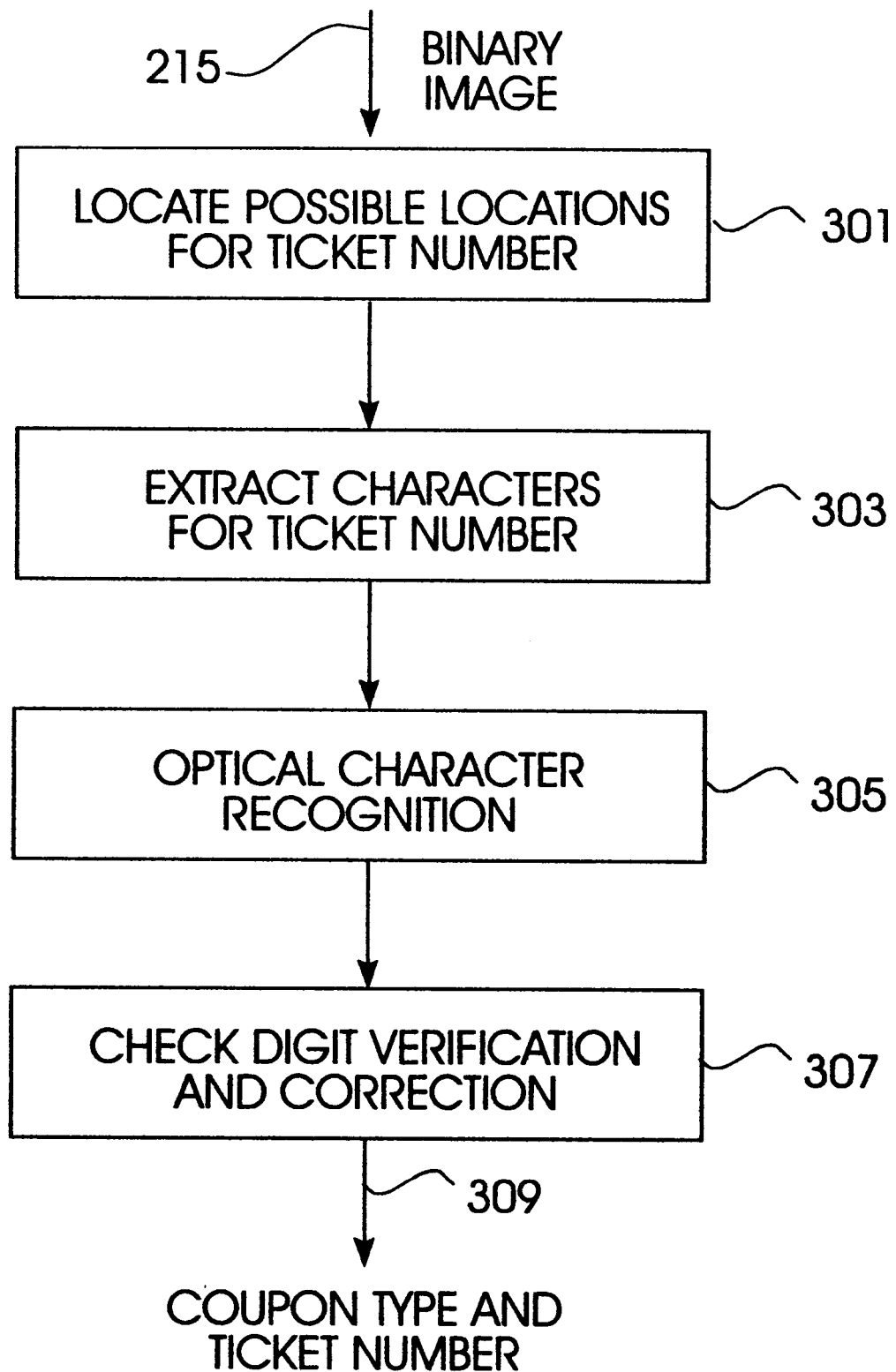
FIG. 3 illustrates an adjunctive aspect of forms identification based upon extraction and recognition of a unique forms type number at a predetermined location on the form.

Referring now to FIG. 3, there is illustrated an adjunctive aspect of forms identification based upon extraction and recognition of a unique forms type number at a predetermined location on the form. First, the ticket number field is located in step 301. In this regard, it is standard commercial practice to emboss tickets or coupons with a black bar or cross at a predetermined location adjacent to a type or class number on a document of interest. In the case of an IATA air coupon, a vertical black bar is located at the bottom part of the Boolean image 215. A rectangular region on the right side of the vertical black bar contains the ticket number. However, this region also contains the airline carrier code and coupon page number, and others.

Since the ticket number contains 10 digits followed by a check digit, the potential ticket number field can easily be identified by the length of the black bob after horizontal and vertical smearing (see next subsection). Then, the 10 digits are segmented using the vertical projection method under the fixed-pitch constraint in step 303. The OCR (see section 2–5) component in step 305 is invoked to recognize the 10 digits and the check digit. The recognition result is verified in step 307 by the following rule: the remainder of the ticket number divided by 7 should be equal to the check digit. Certain corrections can be made if most characters are recognized with high confidence. The output 309 is available for further use.

Character Extraction or the Location of Fixed-pitch Characters

Figure 4:
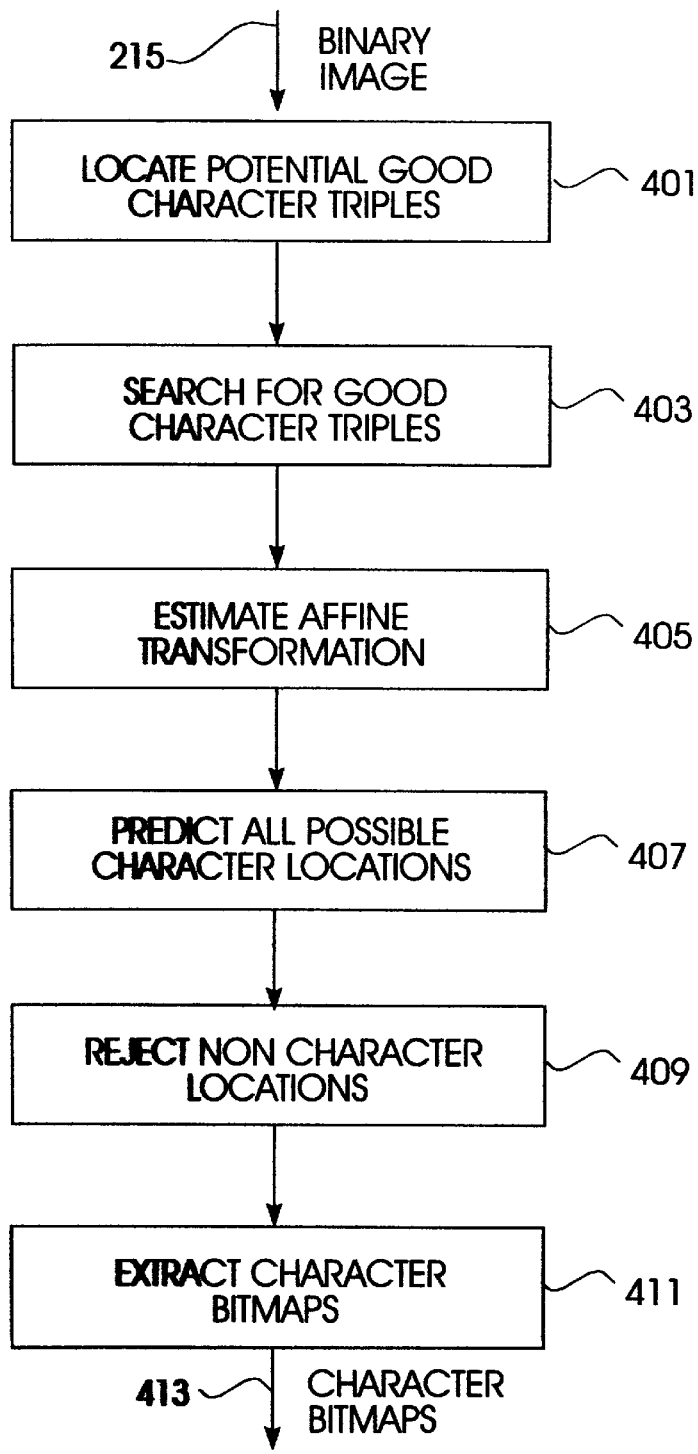
FIG. 4 shows the principal steps in the character extraction process according to the invention.

Referring now to FIG. 4, there is shown the principal steps in the character extraction process according to the invention. More particularly, FIG. 4 labels the steps of the procedure for extracting character bit maps on coupon images. As previously mentioned, the invention is premised on the fact that (a) filled-in machined-printed text on flight coupons is computer-generated and has fixed-pitch and fixed-line spacing; (b) a few good clean characters can almost always be found even though flight coupon images are often very noisy; and (c) an affine transform to predict the locations of all the possible characters on the image can be estimated from these good characters.

Referring again to FIG. 4, attention is directed to step 401 which processes the Boolean-coded (binary) image 215 in order to ascertain a subset of uncontaminated character triples thereon. The localization of good characters is critical to the accuracy of the prediction. In order to make the system robust and reliable, it is desired to search for triples of characters instead of single characters. Moreover, such character triples should be relatively uniformly distributed across the image. However, searching for all possible triples over the entire image is very computationally intensive. Since the pitch and font size are known a' priori (if not, several methods could be used for estimating the pitch and font size), this searching can be significantly shortened by quickly locating a few potentially good character triples. This is achieved by the following procedures.

1. Raster scanning the image and turning any white run, whose length is smaller than the sum of the gap between two neighboring characters and twice the character width, into a black run. As a result, characters are blackened and neighboring characters are connected.

2. Vertically scanning the image and turning any black run, whose run length is not within some tolerance of character height, into a white run. This step eliminates most preprinted big and small characters, and those typed-in characters which are overlapped with preprinted text.

3. Horizontally scanning the image again and removing all the black runs whose length is less than the estimated width of character triples. This step eliminates isolated characters and character couples.

4. Long black clusters are broken into several pieces of length approximately twice the width of character triples.

The result of step 401 is that all the black clusters on the image are considered as potential locations of good character triples. Attention in step 403 now turns toward identifying the locations best among the possible candidate character triples to be used in the construction of the affine transform.

Figure 5:
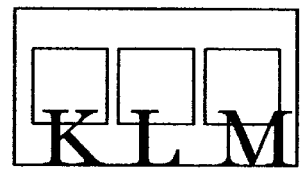
FIG. 5 depicts a mask used for locating a good character triple, the triples being used for approximating the affine transform.

Referring now to FIG. 5 taken together with FIG. 4, a set of criteria is now defined for ascertaining character triples of interest in step 403. Use is made of a mask in which a character triple is enclosed in two boxes, with the smaller box being the bounding box of the character. The gap between the smaller box and bigger box is set to the size of the gap between two neighboring characters. The criteria may be expressed as follows:

(a) maximize the number of black pels inside the three smaller boxes, while minimizing the number of black pels which fall outside the smaller boxes but inside the bigger boxes; and (b) penalize the number of white columns and rows inside the three smaller boxes.

These criteria are combined into a single cost function:

$$c(x, y) = \sum_{i=1}^{3} \left( \left( N_i^{big}(x, y) - N_i^{small}(x, y) \right) + p(N_i^{row}(x, y) + N_i^{col}(x, y)) \right) \quad (2)$$

where (x, y) is the center of the mask; $N_i^{big}(x,y)$ and $N_i^{small}(x,y)$ are the number of black pixels inside the ith bigger box and smaller box, respectively; and $N_i^{row}(x,y)$ and $N_i^{col}(x,y)$ are the numbers of white rows and columns in the ith smaller box, respectively.

Characterized in this manner, the search for a character triple constitutes an optimization problem formulated as finding a position (x*, y*) such that the function c(x*, y*) can be minimized over all possible locations in a black cluster of pels (potentially good character triple locations), i.e., $$c(x^*, y^*) = \min[c(x,y)] \quad (3)$$

Such a position can be obtained for each of the black clusters. However, only those positions whose corresponding costs are below a predetermined threshold would be selected for estimating an "affine transformation".

Now the term "affine geometry" is the study of affine space obtained by choosing a line at infinity in a projective geometry in which distances are only compared on parallel lines so that there is no notion of perpendicularity. "Collinearity" is the mapping of any set of points lying in the same straight line.

An "affine transform" of a plane preserves collinearity under the operations of translation, rotation, scaling, shearing, and reflection such that straight lines are mapped into straight lines and parallel lines into parallel lines. The method of the invention cannot process a partially sheared image, but only if the entire image is distorted in the same manner. That is, only global shearing is mapped. Illustratively, a parallelogram mapped into a parallelogram constitutes an affine transform. However, mapping a parallelogram into a trapezoid does not preserve an affine geometry. Note in the latter case at least one pair of opposite parallel sides are mapped into a pair of nonparallel opposite sides of the trapezoid. Consider by contrast a parallelogram of 90-degree interior angle to a parallelogram of 38-degree interior angle mapping would be deemed affine since collinearity would be preserved, notwithstanding the fact that shearing was present. That is, the entire image would be distorted in the same manner.

Significantly, characters on a machine-printed coupon can be arranged in a matrix. Each character occupies a unique entry in the matrix (1—1 mapping between character and matrix element), and therefore can be indexed by the row and column numbers of the corresponding entry. An empty entry in the matrix represents a blank space.

In this invention, it was discovered that the following affine transformation could be used to model this mapping:

$$\begin{bmatrix} x \\ y \end{bmatrix} = \begin{bmatrix} a & b \\ c & d \end{bmatrix} \begin{bmatrix} i \\ j \end{bmatrix} + \begin{bmatrix} t_x \\ t_y \end{bmatrix} = \begin{bmatrix} ia + bj + t_x \\ ic + dj + t_y \end{bmatrix} \quad (4)$$

where (x,y) and (i,j) are the locations of a character in the image plane and matrix, respectively; and $(t_x, t_y)$ is a translation vector. This affine transformation takes care of rotation, translation, and shearing.

There are six parameters in the matrix equation (Eq. 4). Therefore, three character triples which are not on a line can uniquely determine the affine transform. However, more character triples make the estimation more accurate and more robust to the localization error. Typically, six character triples are sufficient to lead to an accurate estimation.

Referring still again to FIGS. 4 and 5 and especially to step 405, the (i, j) position of the upper-left character triple is determined as follows:

$$i = [x/(c_w + c_g)] \quad (5)$$
$$j = [y/(c_h + l_g)]$$

where $C_W$ and $C_h$ are character width and height, respectively; and $c_g$ and $l_g$ are the gap between neighboring characters and the gap between neighboring text lines, respectively. The operator [×] returns the closest integer to the real number x. The positions of other character triples in the matrix are determined by their relative positions in the image plane.

This estimation works if the skew is small. It was discovered that when the skew angle was greater than 3 degrees, deskewing the image first became necessary. This method can handle local distortion up to $(c_w+c_g)/2$ pels in a horizontal direction and $(C_h+l_g)/2$ pels in a vertical direction.

Once the affine transformation is determined, all the possible character positions can be predicted by Eq. (4). A set of mesh points which are possibly skewed and sheared are formed in the image plane. Every mesh point is then examined using a set of criteria to determine if a character exists at the given location.

This set of criteria for noncharacters comprises:

(a) the number of black pels exceeds 80 percent of the total number of pels in the character box;

(b) the number of black pels is less than the minimum number of pels for the period ".";

(c) the bottom half of the character box is blank;

(d) the number of empty columns exceeds a threshold except for the period;

(e) the number of empty rows exceeds a threshold except for the period and dash "-"; and (f) a period pattern following a noncharacter is not allowed.

The surviving mesh points after this process are relaxed (shifted) in a small neighborhood to recover a small position estimation error and to deal with local distortion. A constraint in this relaxation process is that the shift direction and distance of neighboring mesh points should be smooth (continuous). The character box size is also relaxed within 4 pels to handle small character size variation. This relaxation leads to more accurate position estimations.

Advantageously, this method accurately localizes good character triples. An alternative is to localize good character triples based on character recognition results. But such an alternative suffers from low location accuracy and slow speed because the confidence measure of the character recognizer is not very sensitive to the small shift with respect to the true location.

Grouping Characters Into Fields

Machine-printed text rows and columns in the matrix may be globally shifted. Detecting the starting text row and column cannot be achieved by simply ignoring empty rows and empty columns for the top and left side, respectively. In this regard, a row or column is said to be "empty" if no pattern is recognized with a confidence greater than a prespecified threshold. This simple method is not reliable when the first column or first row contains a few characters (say, 2 characters). In this case, a more sophisticated method is employed.

For the IATA coupon recognition, all the possible charter strings in the neighborhood of the first "city" field location would preferably be passed to a contextual processing module (see FIG. 1, 115, 117). The module returns the exact location of the first "city" field from which the first column and first row can be determined. Once the first column and first row are determined, all the characters in the mesh can be grouped into fields according to the field definition for the corresponding ticket type.

These and other extensions of the invention may be made without departing from the spirit and scope thereof as recited in the appended claims.

What is claimed is:

1. A method for ascertaining the location of a plurality of fixed-pitch, fixed-font characters embedded in a noisy gray-scale image of picture elements (pels) within a complex background, said method being invoked at a time prior to execution of any recognition operations on said characters, the method comprising the steps of:

(a) forming a normalized Boolean-coded version from the gray-scale image;

(b) forming a subset of uncontaminated character triples by filtering the Boolean-coded version in both raster scan line and vertical scan line directions;

(c) deriving an affine transform from the locations (x, y) of at least three noncollinear ones of the subset of uncontaminated character triples, said transform mapping locations (x,y) in the Boolean-coded version to locations (i,j) in the gray-scale image; and (d) estimating the locations (i,j) in the gray-scale image of all possible character triples having locations (x, y) in the Boolean-coded version according to the derived affine transform.

2. The method according to claim 1, wherein each pel in a Boolean-coded version assumes either a black or white color value, and further wherein the step of forming a normalized Boolean-coded version includes the steps of:

(a) determining a global threshold of color values (mean and standard deviation) over the gray-scale image;

(b) determining a local threshold of gray-scale values (mean and standard deviation) in an m×n pel neighborhood around each pel; and (c) solving the gray-scale magnitude of each pel as either a black or white against the local threshold according to whether the standard deviation of the gray-scale in the local region exceeds a predetermined magnitude, otherwise resolving the gray-scale magnitude of the pel against the global threshold.

3. The method according to claim 1, wherein cluster runs of Boolean-coded pels of a first kind are assigned the color value black, further wherein cluster runs of Boolean-coded pels of a second kind are assigned the color value white, and further wherein the step of forming a subset of uncontaminated character triples comprises the steps of:

(a) raster scanning the Boolean-coded version and converting any white cluster run of pels into a black cluster run, thereby blackening characters and connecting neighboring characters if the length of the white cluster run is less than the gap between two neighboring characters plus twice the character width;

(b) vertically scanning the Boolean-coded version and converting any black cluster run into a white cluster run if the black run does not lie within a predetermined tolerance of character height;

(c) horizontally scanning the Boolean-coded version again and removing all black cluster runs whose length is less than the width of character triples;

(d) breaking any scanned long black cluster runs in the Boolean-coded version into several pieces whose lengths are approximately twice the width of a character triple; and (e) ascertaining the location in the Boolean-coded version of at least three uncontaminated character triples by convolving a mesh over black cluster runs, applying a cost function thereto, relative magnitude comparing the cost function as applied to each black cluster run with a threshold, and selecting those cluster runs as uncontaminated character triples whose cost function is less than the threshold.

4. The method according to claim 1, wherein the step of deriving an affine transform further includes the step of ascertaining the location (i,j) in the gray-scale image of a predetermined one of the character triples such that $i=[x/(c_w+c_g)]; j=[y/(C_h+l_g)]$; $C_W$, $C_h$ are character width and height; and $c_g$, $l_g$ are the intercharacter gap and the gap between neighboring text lines, respectively.

5. The method according to claim 1, wherein the step of estimating the locations (i,j) in the gray-scale image from locations (x,y) in the Boolean-coded version further includes the step of mapping the locations according to the affine transform $$\begin{bmatrix} x \\ y \end{bmatrix} = \begin{bmatrix} a & b \\ c & d \end{bmatrix}\begin{bmatrix} i \\ j \end{bmatrix} + \begin{bmatrix} t_x \\ t_y \end{bmatrix} = \begin{bmatrix} ia+bj+t_x \\ ic+dj+t_y \end{bmatrix}$$

where a, b, c, and d are constants, and ($t_x$, $t_y$) are translation vectors.

6. A method for ascertaining the location of a plurality of fixed-pitch, fixed-font characters formed from cluster runs of Boolean-coded pels of a first kind embedded in a noisy original Boolean-coded image and prior to execution of any recognition operations on said characters, said characters ideally being separated by cluster runs of Boolean-coded pels of a second kind, comprising the steps of:

(a) forming a normalized Boolean-coded version from the original Boolean-coded image:

(b) forming a subset of uncontaminated character triples by filtering the normalized Boolean-coded version in both the raster scan line and vertical scan line directions to increase the contrast of character triples otherwise masked by cluster runs of Boolean-coded pels of the first kind;

(c) deriving an affine transform for mapping locations (x,y) in the normalized Boolean-coded version to locations (i,j) in a revised Boolean-coded image, said affine transform being derived from the locations (x, y) in the normalized Boolean-coded version of at least three noncollinear ones of the plurality of uncontaminated character triples; and (d) estimating the locations (i,j) in the revised Boolean-coded image from the Boolean-coded version of all possible characters according to the affine transform.

7. The method according to claim 6, wherein cluster runs of Boolean-coded pels of the first kind are assigned the value black, further wherein cluster runs of Boolean-coded pels of the second kind are assigned the value white, and wherein step (b) further comprises the steps of:

(a) raster scanning the normalized Boolean-coded version and converting any white cluster run of pels into a black cluster run, thereby blackening characters and connecting neighboring characters if the length of the white cluster run is less than the gap between two neighboring characters plus twice the character width;

(b) vertically scanning the normalized Boolean-coded version and converting any black cluster run into a white cluster run if the black run does not lie within a predetermined tolerance of character height, thereby eliminating preprinted large and small characters and typed-in characters overlapped with preprinted text;

(c) horizontally scanning the normalized Boolean-coded version again and removing all black cluster runs whose length is less than the width of character triples, thereby eliminating isolated characters and character couples; and (d) breaking long black cluster runs into several pieces whose lengths are approximately twice the width of a character triple.

8. An apparatus for ascertaining the location of a plurality of fixed-pitch, fixed-font characters embedded in a noisy gray-scale image of picture elements (pels) with a complex background, said apparatus being operable at a time prior to execution of any recognition operations on said characters, comprising the steps of:

(a) means for deriving a normalized Boolean-coded version from the gray-scale image;

(b) means for forming a subset of uncontaminated character triples including means for filtering the Boolean-coded version in both raster scan line and vertical scan line directions;

(c) means for deriving an affine transform for mapping locations (x, y) in the Boolean-coded version to locations (i,j) in the gray-scale image, said approximation being derived from the locations (x, y) of at least three noncollinear ones of the plurality of uncontaminated character triples; and (d) means for estimating the locations (i,j) in the gray-scale image of all possible character triples according to the affine transform.

9. An article of manufacture comprising a machine-readable memory having stored therein a plurality of processor executable control program steps for ascertaining the location of a plurality of fixed-pitch, fixed-font characters formed from cluster runs of Boolean-coded pels of a first kind embedded in a noisy Boolean-coded image, said characters ideally being separated by cluster runs of Boolean-coded pels of a second kind, said plurality of stored, processor executable, control program steps include:

(a) a control program step for forming a normalized Boolean-coded version from the original Boolean-coded image;

(b) a control program step for forming a subset of uncontaminated character triples by filtering the normalized Boolean-coded version in both the raster scan line and vertical scan line directions;

(c) a control program step deriving an affine transform for mapping locations (x,y) in the normalized Boolean-coded version to locations (i,j) in the gray-scale image, said affine transform being derived from the locations (x, y) in the normalized Boolean-coded version of at least three noncollinear ones of the plurality of uncontaminated character triples; and (d) a control program step for estimating the locations (i,j) in the gray-scale image of all possible character triples having locations (x, v) in the normalized Boolean-coded version according to the affine transform.

* * * * *